United States Patent [19]
Noble

[11] Patent Number: 5,258,618
[45] Date of Patent: Nov. 2, 1993

[54] INFRARED IMAGER FORMING TWO NARROW WAVEBAND IMAGES OF THE SAME OBJECT FIELD

[75] Inventor: Milton L. Noble, Liverpool, N.Y.

[73] Assignee: General Electric Company, Syracuse, N.Y.

[21] Appl. No.: 805,646

[22] Filed: Dec. 12, 1991

[51] Int. Cl.[5] .................................. G01J 3/51
[52] U.S. Cl. .......................... 250/332; 250/338.4; 250/339; 359/359
[58] Field of Search ............. 250/332, 338.4, 339; 359/359

[56] References Cited

U.S. PATENT DOCUMENTS

| | | | |
|---|---|---|---|
| 4,783,593 | 11/1988 | Noble | 250/352 |
| 4,996,427 | 2/1991 | Noble et al. | 250/332 |
| 5,072,109 | 12/1991 | Aguilera, Jr. et al. | 250/226 |

Primary Examiner—Constantine Hannaher
Attorney, Agent, or Firm—Paul Checkovich; Stephen A. Young

[57] ABSTRACT

The invention relates to an improved IR imaging system for detecting a target producing an IR signature obscured by an ambient IR background. The imager comprises an objective lens, preferably of a telecentric design, and an area IR detector array. Two narrow wavebands are selected by an unpatterned bandpass filter, and a two part patterned filter, one part a long pass filter and the other part a short pass filter, installed close to the IR detector array. This choice permits the patterned filters to be quite thin, and more readily formed into smaller elements allowing increased image resolution. The use of a telecentric objective lens and the use of filters having higher average indices of refraction permit a wide field of view without compromising filter operation from filter wavelength shift.

8 Claims, 6 Drawing Sheets

FIG. 3

FIG. 4A
UNPATTERNED
BANDPASS
FILTER

FIG. 4B
THERMAL
REFERENCE
LONGPASS
FILTER

FIG. 4C
RESULTING
THERMAL
REFERENCE
BANDPASS

FIG. 4D
PLUME BAND
SHORTPASS
FILTER

FIG. 4E
RESULTING
PLUME
BANDPASS

WAVELENGTH (MICRONS)

FIG. 5A
UNPATTERNED
BANDPASS
FILTER

FIG. 5B
PLUME BAND
LONGPASS
FILTER

FIG. 5C
RESULTING
PLUME
BANDPASS

FIG. 5D
SOLAR
REFERENCE
SHORTPASS
FILTER

FIG. 5E
RESULTING
SOLAR
REFERENCE
BANDPASS

WAVELENGTH (MICRONS)

37B REFERENCE BAND STRIPES
37A PLUME BAND FILTER STRIPES

FIG. 7B

INFRARED IMAGER FORMING TWO NARROW WAVEBAND IMAGES OF THE SAME OBJECT FIELD

BACKGROUND OF THE INVENTION

The invention relates to infrared (IR) imaging systems in which two images are formed of the same object field using two different narrow wavebands to enhance detection of a target whose IR signature is otherwise obscured by strong background clutter.

PRIOR ART

Infrared imaging systems, which are simultaneously responsive to two differing narrow IR wavebands are useful in object detection An important practical case is that of a jet aircraft for which the jet plume creates strong radiation over a portion of the medium wave infrared (MWIR) spectrum including the atmospheric $CO_2$ absorption band, in the presence of a strong IR background clutter.

Two color IR sensors can be designed to reduce the obscuring effect of this background clutter radiation. To do this job well, it is critical that the two different waveband images be well registered with one another. This objective is important to effective clutter background rejection, but in practice difficult to achieve.

Most known approaches have significant limitations. Those approaches which use two separate camera systems and superimpose images suffer from differences in size and spatial scale distortion between the two images. A preferred approach which avoids image distortion with two separate optics is to use a single camera system and a single array.

A known approach, which uses a single camera and a single array adds two narrow waveband selection filters in a checkerboard or a stripe pattern arranged upon the IR detector array. The two filters divide the area of the detector array in half with one half responding to one waveband, and the other half responding to the other waveband.

There are two significant technical problems with the current optical system described above. Current two color, single focal plane optical systems employ patterned bandpass filters limited to relatively coarse pixel pitches. Additionally real world applications require optics of wide field of view, which produce excessive shifts in the filter waveband Typically these shifts can be equal to or larger than the bandwidth of the optimal filter.

The ultimate goal for filter pitch is that each filtered image should have a resolution equivalent to the pitch of the detector pixels in one dimension and equivalent to one half the pitch of the detector pixels in the other dimension. This image resolution can only be achieved by patterning the filter to the same pitch as the individual pixels making up the detector array. Some detector array pixel pitches are now 2 mils or less, but matching filters of this fine pitch are not available using current patterned filter technology. The term "mil" as used herein means one-thousandth of an inch (0.001"). Using the well-known transformation that one meter (m) may be represented by 39.37 inches, then unless specifically stated otherwise, one mil, or fraction or multiple thereto may also be designated as 25.4 micrometers ($\mu$m) or microns, or a corresponding fraction or multiple thereof.

To avoid the loss in usable pixel photo-sensitive area (i.e. fill factor), the boundaries between the filter elements should be as fine as possible and in precise registration with the detector pixels.

The desired filter responses of the two narrow wavebands are generally well known, given the application. One filter should select a narrow waveband portion of the IR spectrum characteristic of the target and the other filter should select a narrow waveband portion of the IR spectrum characteristic of the scene background and substantially free of emission by the target to be detected.

The conventional method of selecting two narrow wavebands is to use two interference filters, one for each narrow waveband. Each filter is made up of successive pairs of thin layers of IR transmissive material having alternating indices of refraction. The thickness of each layer is formed in odd multiples of a quarter wavelength of the radiation to be transmitted.

The problem with using individual bandpass filters for each band is that in the MWIR spectrum, at 3 to 5 $\mu$m wavelength, bandpass filters for narrow waveband selection become very thick (e.g. 25 to 35 microns thick), making it difficult to form filter elements at a pitch smaller than 4 to 5 mils.

Currently patterned filters with a pitch finer than 4 to 5 mils cannot be achieved due to processing limitations with the thicker bandpass filter elements. The photolithographicall defined edges of these filter elements have sides which are inclined inwardly at approximately 30°. Currently filter elements are 1 to 1½ mils thick, square in plan view, and when a 2 mil pitch is required, then the planar fill factor of each filter element becomes excessively small, in the region of 25% or less. With these high pixel boundary losses, larger sized filter elements are required, which compromises image resolution.

The problem with wide field of view (WFOV) optics is that rays incident at 30° to 40° from normal also impinge on the filters at 30° to 40° from normal. The effect upon the filter is to cause a downward shift in the wavelength of the passband causing the pixels at the edge of the array to have a shorter wavelength passband than the pixels at the center of the array. Since the bandwidths required for target detection are narrow, this detuning can cause a substantial or complete target loss. This problem can be avoided by reducing the field of view, but some applications demand a wide field of view.

SUMMARY OF THE INVENTION

The present invention is directed to providing a novel IR imager responding to two narrow waveband images of the object field, in which system improvements have been made to permit wide field of view operation by reducing the filter waveband shift, with large angles of incidence, and methods of fabrication for finer pitch patterned filters.

This performance is achieved in a novel sensor system comprising a quasi-telecentric objective lens for imaging an IR scene through a combination patterned-/unpatterned spectral filter upon a focal plane. The two narrow wavebands are selected by an unpatterned bandpass filter arranged between the objective lens and the array for selecting a target portion of the medium wave infrared (MWIR) band including a narrow wave reference band and a narrow wave target detection band and a two-part patterned filter. One part of the patterned filter provides long-wave pass filtering to a first group of pixels and the other part provides short-wave pass filtering to a second group of pixels.

The long wavelength limit of the passband of the bandpass filter and the cut-on wavelength of the long-wave pass filter are chosen to provide a passband for selection of one of the narrow wavebands for application to one group of pixels. The shorter wavelength limit of the passband of the bandpass filter and the cut-off wavelength of the short-wave pass filter are chosen to provide a passband for selection of the other narrow waveband for application to the other group of pixels.

This filtering strategy allows the patterned filters to be approximately one-third the thickness of current patterned filters having bandpass characteristics. These patterns may be configured either in a checkerboard or stripe arrangement. This results in smaller area filter elements yielding higher resolution and higher fill factor with less loss of scene radiation.

Wide field of view operation is further facilitated by use of an objective lens which employs a telecentric arrangement designed to minimize the angle of incidence of ray bundles at the spectral filters, thereby reducing the passband shift. A further reduction in the passband shift may be achieved by using filter materials which provide a higher average index of refraction. In a practical case, an increase in the average index of refraction from about 2.7 to 3.7 brings about a nearly 40% reduction in the passband shift.

BRIEF DESCRIPTION OF THE DRAWINGS

The inventive and distinctive features of the invention are set forth in the claims. The invention itself, however, together with further objects and advantages thereof may best be understood by reference to the following description and accompanying drawings, in which:

DESCRIPTION OF THE PREFERRED EMBODIMENT

Figure 1:
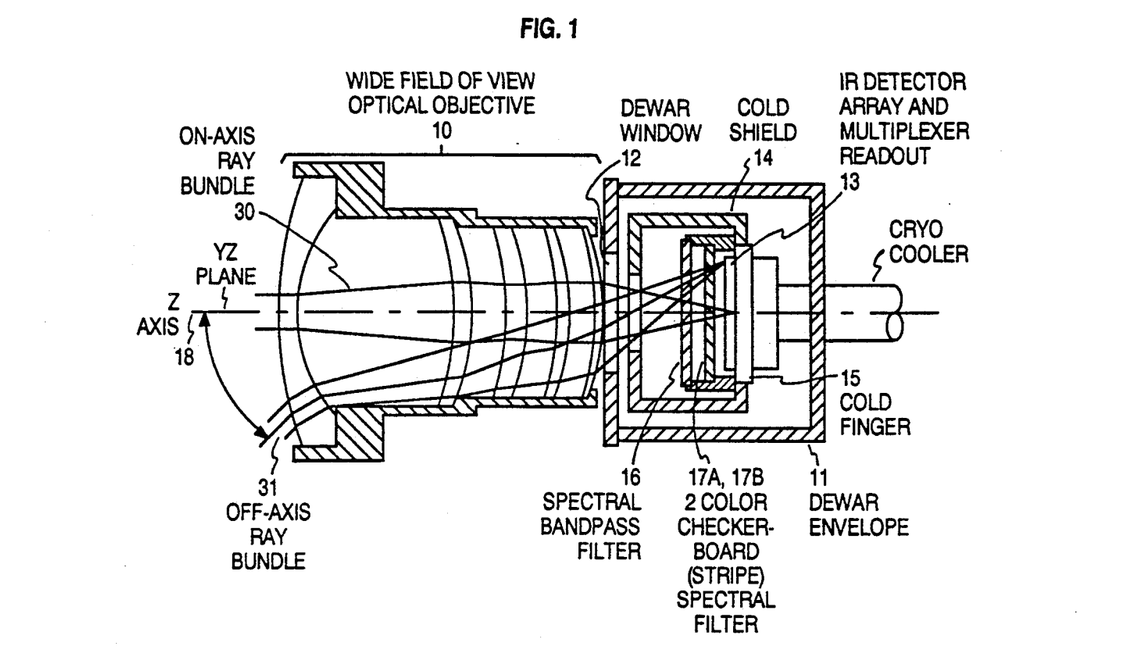
FIG. 1 is a cross-sectional view of a novel infrared (IR) imager having a conventional objective lens providing a wide field of view and responding to two narrow midwave infrared bands of an object field using a novel filter arrangement.

A novel wide field of view (WFOV) infrared imager, which in a practical embodiment responds to two narrow wavebands of medium wave infrared illumination, is shown in cross section in FIG. 1.

As shown in FIG. 1, the imager comprises a conventional wide field of view objective lens 10, shown schematically as a five element lens external to a cryogenic dewar 11 and operated at ambient temperature (300K) and an IR sensitive photodetector array 13 and associated components (14, 15, 16, 17), which are within the dewar and operated at cryogenic temperatures.

The objective lens 10, typically provides a 60 to 80 degree field of view with a nominal f/2 aperture. An on-axis ray bundle 30 and an off-axis ray bundle 31 are illustrated passing through the bandpass filter and focused on the combination IR spectral filter 17A, 17B and IR detector array 13. The on-axis bundle impinges on the filters and array along the optic axis, or normal to the filters and the array. The extreme off-axis bundle impinges on the IR array at about the same angle of incidence as the angle of incidence of rays from the distant target impinge on the objective lens (60° to 80°), and thus departs 30° to 40° from the filter/IR array normal.

The dewar 11 includes an IR transparent window 12 through which IR radiation enters the dewar enclosure. The dewar contains a cold shield 14 provided with a cold aperture 15 for admitting infrared scene radiation imaged upon the photodetector array 13 while screening out dewar/lens background radiation beyond the boundaries of the useful image. The novel optical filtering for selection of specific narrow bands of medium wave IR is provided by the filters (16, 17A, 17B), both contained within the dewar. Filters 17A, 17B are in closest possible proximity to the IR array 13. The filters 17A, 17B are shown in FIGS. 6A, 6B and 7A, 7B.

In accordance with the invention, two narrow IR wavebands are selected by the novel combination of an unpatterned (planar) IR transmission filter 16, which provides a bandpass characteristic, and the patterned IR transmission filter (17A, 17B) placed close to the array, which has both long (wavelength) pass and short (wavelength) pass IR filter elements.

As shown in FIGS. 6A, 6B and 7A, 7B, the total area assigned to the long pass elements is equal to the area assigned to the short pass elements. The two sets of filter elements can be spatially configured in either a checkerboard (FIGS. 6A, 6B) or stripe (FIGS. 7A, 7B) arrangement both which equalize the areas covered by the respective filter sets over smaller portions of the image. The checkerboard pattern, which the two sets of filter elements replicate, has the property that the individual filter elements of the two sets are square, and alternate in horizontal, vertical or diagonal lines like the red and black squares of a checkerboard. In the stripe pattern, long pass stripes and short pass stripes alternate. In addition to equal area coverage on both a large and small scale, the filter squares or stripes are precisely dimensioned and registered with the array pixels to intercept the radiation impinging on whole pixels of the array.

The result of the foregoing distribution of filter elements is that the array pixels under on set of filter elements form an image of the same subject matter and with the same reduced resolution as the array pixels under the other set of filter elements, but illuminated by a different portion of the IR spectrum.

In addition, the optical elements of the IR imager are aligned in relation to the system axis 18. For spatial reference, the system axis coincides with the Z axis, which is assumed to lie in a horizontal plane (the plane of the paper). The X axis, orthogonal to the Z axis, also lies in this horizontal plane, and as will be seen, extends in the same direction as breadth in the image plane of the objective lens and in the same direction as the rows in the photodetector array 13. The Y axis, orthogonal to the other two, is vertical (out of the plane of the paper) and extends in the same direction as height in the image plane and in the same direction as the columns in the photodetector array.

Figure 2:
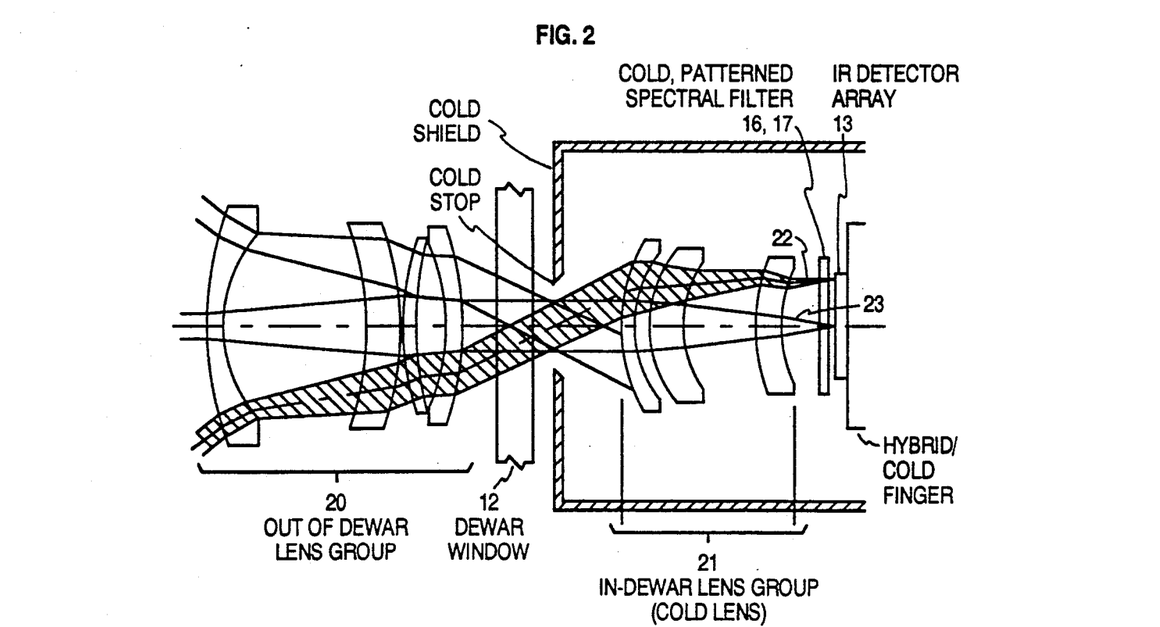
FIG. 2 is an illustration of a novel IR imager having an improved objective lens of a quasi telecentric design providing a wide field of view in a manner facilitating more efficient narrow waveband selection.

An imager in accordance with a second embodiment of the invention and having an optical system with improved performance over that of FIG. 1 is shown in FIG. 2. The FIG. 2 embodiment may also employ the filtering arrangement shown in FIGS. 6A, 6B, 7A, 7B. The current technology wide angle lens shown in FIG. 1 presents ray bundles 31 at the margin of the field of view which impinge on the filters and the IR array at a 30° to 40° angle of incidence. Interference filters, when illuminated by rays displaced from the normal, exhibit a shift in the filter transmission response to a shorter wavelength. The wavelength shift of interference filters to shorter wavelengths with increased angles of incidence ca drastically alter the filter response with narrow band filters used at large angles of incidence. At 30° incidence the percent shift ranges from 1%, to 2% and at 40° incidence the shift can range from 1.8% to over 3% (source: Photonics Design and Applications Handbook). A bandpass filter at 4.5 microns would experience a wavelength shift of 0.045 to 0.090 microns at 30° incidence and at 40° the shift grows to 0.081 to 0.135 microns. In the event that the narrow bands of interest are only 0.2 microns or less in width, an 0.045 micron to over 0.10 micron wavelength shift will be quite unsatisfactory. One solution is to reduce the field of view to reduce the magnitude of wavelength shift. A form of this solution, adopted in the present invention, is to use an objective lens of a quasi-telecentric design which can limit the extreme angle of incidence, at the edge field of the IR array, to about one-half the angle of incidence of rays impinging on the objective lens, and thus reduce the filter wavelength shift.

The lens 20, 21 has an approximate f/2 aperture and is of a quasi-telecentric design in order to minimize the angle of incidence of off-axis ray bundles at the IR filters 16, 17A, 17B and at the IR array. This design choice makes the optical waveband selection of the interference filters more uniform over the image plane, reducing the frequency shift to less than half of the uncorrected value.

The quasi-telecentric objective lens which provides a wide field of view is illustrated in FIG. 2. It anticipates a nominal design with four elements 20 placed outside of the dewar window 12 and therefore at ambient temperatures ($\sim$300 K) and three elements 21 placed inside the dewar and at reduced temperatures (80 K to 90 K).

The optical design shown in FIG. 2 is not a finished design, but a preliminary design provided only to demonstrate the general principles of a quasi-telecentric design. The optical elements 21 are set between the fold shield aperture 14 and the Ir filters (16, 17A, 17B). Telecentric lenses of the class of interest herein are described in U.S. Pat. No. 4,783,593 to Milton Noble entitled "Optical System For Wide-angle Infrared Imagers" patented Nov. 8, 1988.

A purely telecentric design is not practical, nor required, with the wide field of view and relatively large aperture herein contemplated. Accordingly, assuming a total field of view of 84 degrees, a departure of less than 30° in the angle of incidence of ray bundles at the focal plane is tolerable for filter wavelength shift. Limiting the maximum departure to less than 30°, limits the shift in the spectral response of the patterned spectral filter (which is a non-linear function of the angle of incidence) to less than one percent. In terms of wavelength, a one percent shift in wavelength at 4.5 microns shifts 0.045 microns to a 4.455 microns wavelength. In this application with filter bandwidths of 0.1 $\mu$m or larger, such a compromise can be tolerated; particularly with the novel patterned spectral filter fabrication approaches herein described.

Figure 3:
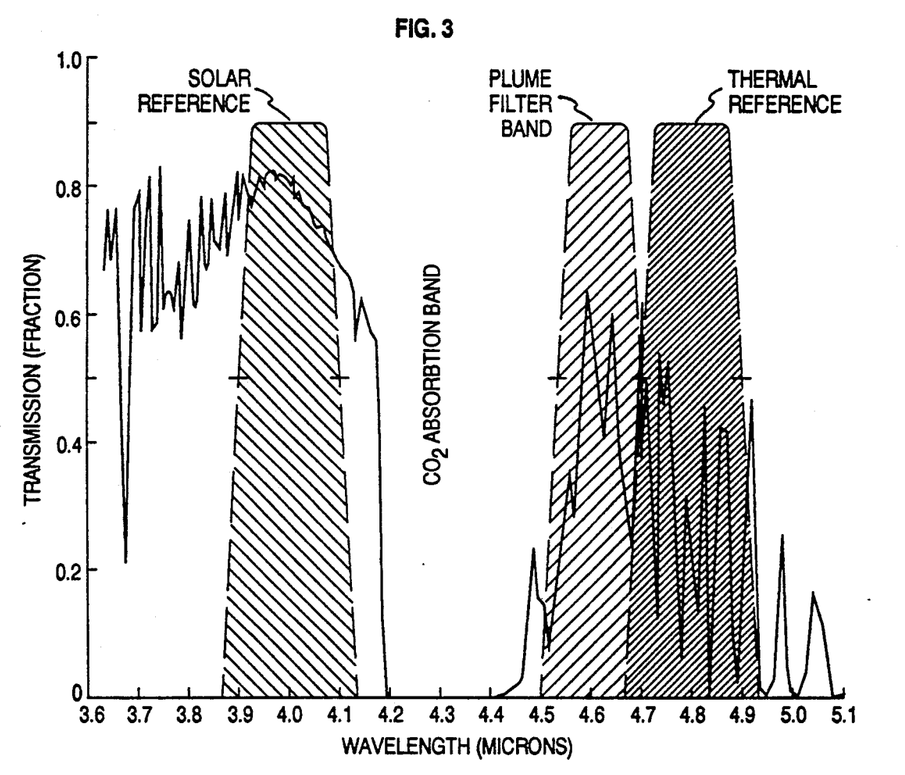
FIG. 3 is a graph of atmospheric path IR transmission with three selected filter wavebands superimposed, including a solar reference band, a thermal reference band, and a target detection, or plume filter, band.

FIG. 3 indicates a plume filter band and two reference bands, that can alternately be used to reduce or remove the background clutter from a plume band image of a jet aircraft. FIG. 3 is the result of a LOW-TRAN computer simulation that graphs the atmospheric path transmission of infrared radiation in a wavelength region from 3.6 to 5.4 microns. Relative path transmission is given for a low altitude path (20 meters), for a 3 kilometer constant pressure path length, in a maritime environment with seeing conditions at a visibility of 23 kilometers. This graph illustrates substantial atmospheric IR transmission starting from 3.6 microns and continuing to nearly 4.2 microns, where the $CO_2$ absorption band begins, Strong $CO_2$ absorption continues to almost 4.5 microns, and atmospheric IR transmission returns at 4.5 microns and continues to about 5.1 microns with numerous narrow $H_2O$ absorption lines.

FIG. 3 illustrates the three narrow filter wavebands superimposed upon the atmospheric transmission graph, and selectable by appropriately designed filters. The region between 3.9 and 4.1 microns is tiered the "solar reference" band, and that between 4.7 and 4.9 microns is termed the "thermal reference" band which sense a part of the normal IR background illumination. The term "reference" is used to denote that these two bands may be used for clutter discrimination when it is desired to sense a clutter-free image of the plume of a jet engine, which is made up of to exhaust gases containing large quantities of $CO_2$. In atmospheric transmission, most of the jet engine plume radiation is absorbed in a short distance by atmospheric $CO_2$. The wider radiation band, however, is partially due to doppler broadening in the hot gases and thus two spikes normally appear one on either side of the $CO_2$ absorption band. The smaller and narrower spike at shorter wavelengths from 4.2 $\infty$m is called the "blue spike" and the larger spike at longer wavelengths than 4.5 $\mu$m is called the "red spike". An IR sensor respond to the "plume band", a narrow IR waveband between 4.5 and 4.7 microns which contains the red spike, thus will sense both the jet aircraft and a background clutter similar to that in either reference band. The narrow IR wavebands called the thermal reference band or the solar reference band, either of which is generally free of jet engine plume radiation, can be used of enhance the aircraft signature by a ratio or difference operation that subtracts a substantial portion both background clutter.

In accordance with the invention, the novel two color filters shown in FIGS. 6A, 6B and 7A, 7B permit a single IR sensitive detector array to obtain two registered IR images, one using plume band illumination, and the other using thermal or solar reference band illumination; and the improved optics of FIG. 2 permits operation over a wise field of view with minimal loss due to filter response wavelength shifts.

The novel filters are shown in FIGS. 6A, 6B and 7A and 7B. In each case, the filers include the combination of an unpatterned bandpass filter 16 and a patterned filter, which has a short wavelength pass portion (17A) and a long wavelength pass portion (17B). the filter transmission characteristics of a thermal band reference are illustrated in FIGS. 4A through 4E and a solar reference in 5A through 5E. A processor, not a pat of the present invention, combines the images, each utilizing a different portion of the IR spectrum in such a way as to highlight the presence of the plume image by removing a substantial portion of the background clutter. The novel means for selecting the two IR wavebands explained with respect to FIGS. 4A through 4E and 5A through 5E permits a simplification in the construction of the patterned filters shown in FIGS. 6A, 6B and 7A, 7B, which allows patterned filters to be fabricated with reduced pitch, down to 2 mils.

Figure 4A:
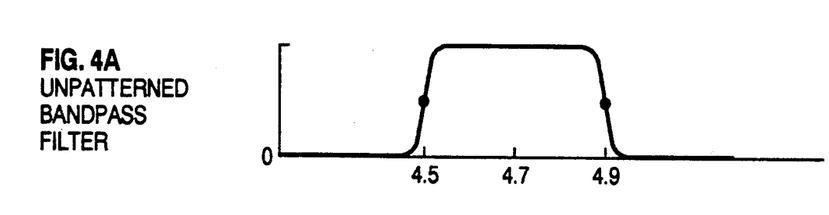
FIGS. 4A through 4E are graphs of the spectral response of a first novel set of IR filters for selecting a thermal reference band and a plume band for improved detection of targets like jet aircraft by enhanced clutter rejection and the resulting thermal reference and plume bands.
Figure 4B:
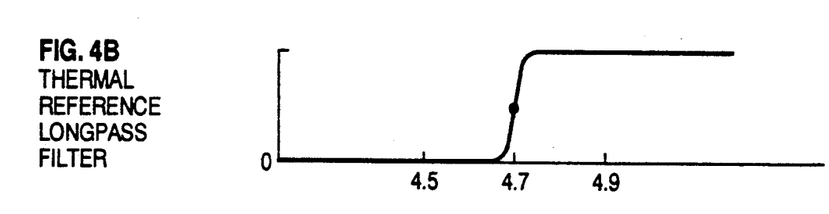

In FIGS. 4A through 4E, the plume band selecting is achieved by the joint action of the filters 16 and 17A (shown in FIG. 1). FIG. 4A is a graph of the bandpass filter 16 which has a sharp cut-on at 4.5 microns, exhibits a flat and relatively narrow passband between 4.5 and 4.9 microns, ending in a sharp cut-off at 4.9 microns. The filter 16 intercepts the entire image and being unpatterned may be of adequate thickness to active the necessary steep cutoff properties. The thermal reference filter 17B, which is a patterned filter intercepting small sampled sets of pixels uniformly distributed over the array, has a long wavelength pass characteristic, cut-on at 4.7 microns, as illustrated in FIG. 4B. A short wavelength pass or a long wavelength pass characteristic filter may be achieved with a physically thinner filter than a bandpass filter. Thus, a patterned (checkerboard or stripe) filter can be made much thinner: 7 to 9 microns vs 25 to 30 microns. A thinner filter can be effectively patterned at a smaller pitch. For example our past experience, with patterned bandpass filters, limits the detector pitch to about 4 mils. Use of the combination planar bandpass and patterned long and short pass filters should permit detector arrays with reduced pitch to about 2 mils.

Figure 4C:
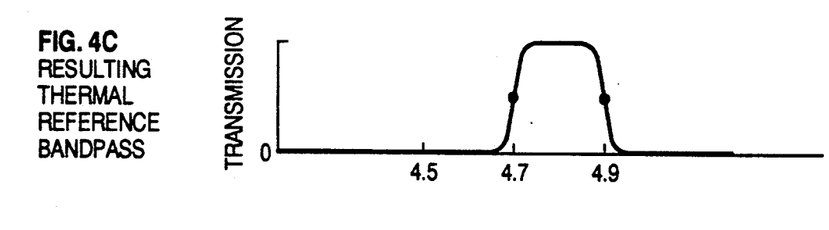

The combined response of the bandpass filter 16 and the long wavelength pass filter 17B provides a steep, bandpass characteristic between 4.7 microns and to 4.9 microns for the thermal reference band, illustrated in FIG. 4C.

Figure 4D:
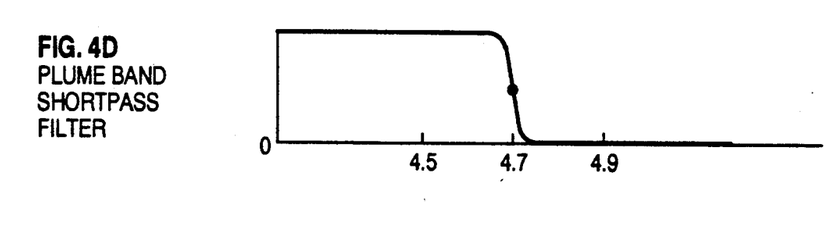
Figure 4E:
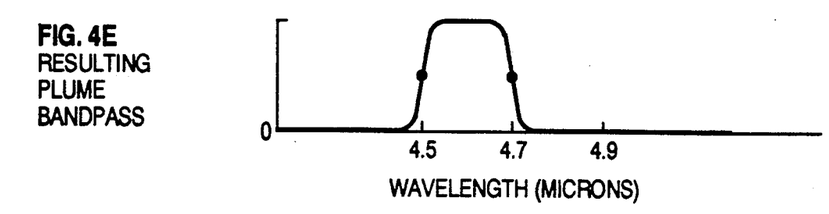

The plume band is selected using the combined response of the bandpass filter 16 and a short pass filter 17A having a cut-off at 4.7 microns, illustrated in FIG. 4D. The combined response of the two filters is the bandpass characteristic between 4.5 and 4.7 microns illustrated in FIG. 4E.

Figure 5A:
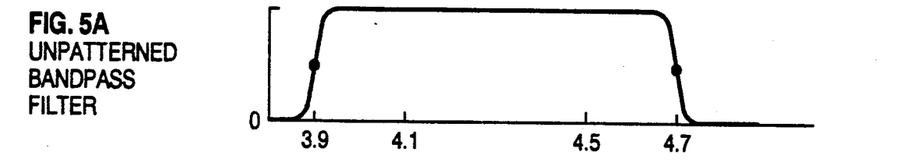
FIGS. 5A through 5E are graphs of the response of a second novel set of IR filters for selecting a solar reference band and a plume band with clutter rejection permitting improved jet aircraft target detection and the resulting thermal reference and plume bands.
Figure 5B:
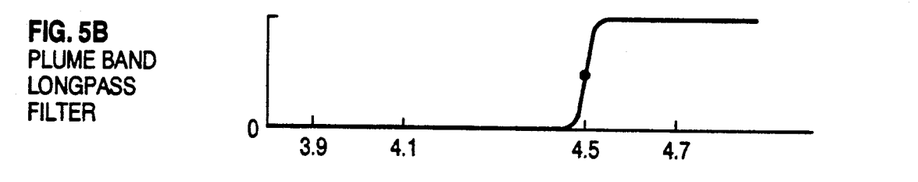
Figure 5C:
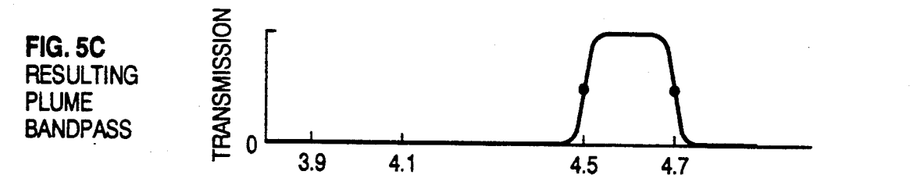
Figure 5D:
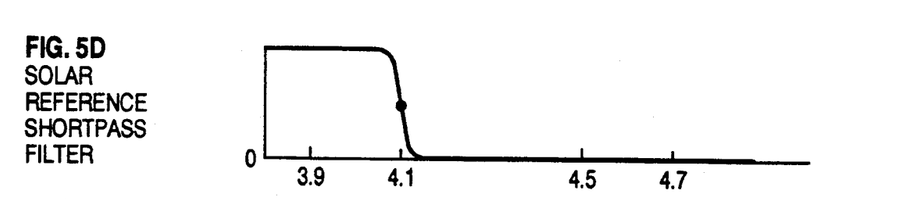

The spectral transmission requirements of an alternative set of filters designed to use the solar reference band and the plume band are illustrated in FIGS. 5A through 5E. Here the plume band selection is achieved by the joint action of a set of filters 16 and 17B having a differing set of transmission properties from those exhibited in FIGS. 4A and 4B. The bandpass filter 16 for this application has a flat and broader passband between 3.9 and 4.7 microns while the patterned plume filter 17B, has a long pass characteristic with cut-on at 4.5 microns. The combined response is a bandpass for the plume band between 4.5 and 4.7 microns as illustrated in FIG. 5C.

Figure 5E:
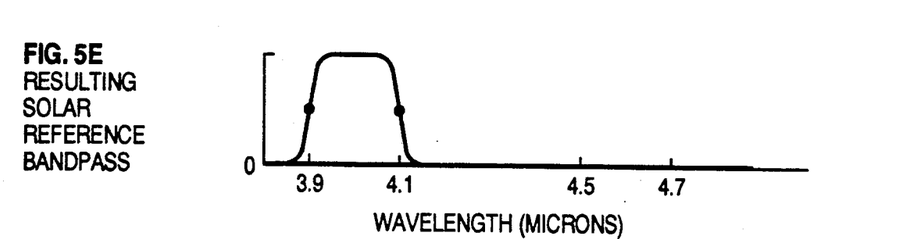

The solar reference band is selected using the bandpass filter 16 in combination with a patterned short pass filter 17A having a cut-off at 4.1 microns. The combined response of 16 and 17A is a bandpass for the solar reference band between 3.9 and 4.1 microns as illustrated in FIG. 5E.

The benefit of using a separate, unpatterned bandpass filter characteristic in combination with a short pass or low pass characteristic for the two patterned filters is that each patterned filter is simpler and thinner than a bandpass filter and accordingly may be patterned at a smaller pitch than if bandpass filters were used.

The filters 17A and 17B, may be photolithographically patterned into minimum pixel sizes of 2 to 3 mils (50-100 microns). This smaller size is facilitated by the fact that these filters are only 7 to 9 microns thick. The patterning process produces the trapezoidal cross-section, indicated in FIG. 6B. Pixel loss in fill factor (percentage of usable area) from the trapezoidal cross-section is tolerable in the case of a thin filter (7 to 9 microns thick), but becomes intolerable for a bandpass filter 25 to 35 microns thick. With the thicker filter, the pixel area must be increased first to permit basic filter fabrication and secondly to achieve a useful fill factor. Thus, the thinner patterned filter has a very substantial advantage.

Figure 6A:
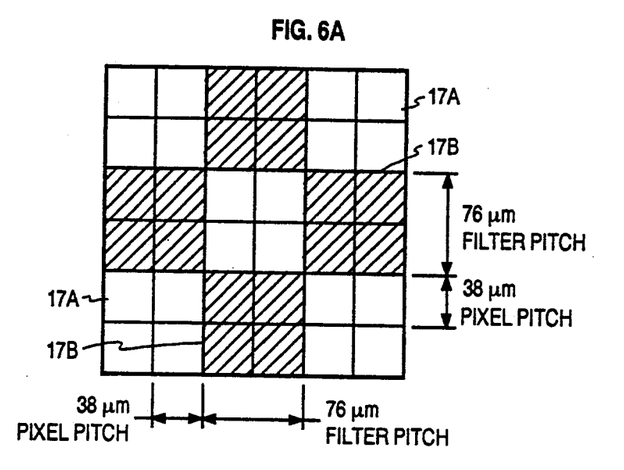
FIGS. 6A and 6B are plan and side elevation views, respectively, showing a portion of a novel checkerboard filter which in combination with a planar bandpass filter provides narrow waveband selection of a plume band and reference band with improved image discrimination against stressing IR clutter backgrounds, as illustrated in FIGS. 4C and 5C, and 4E and 5E, respectively.
Figure 6B:
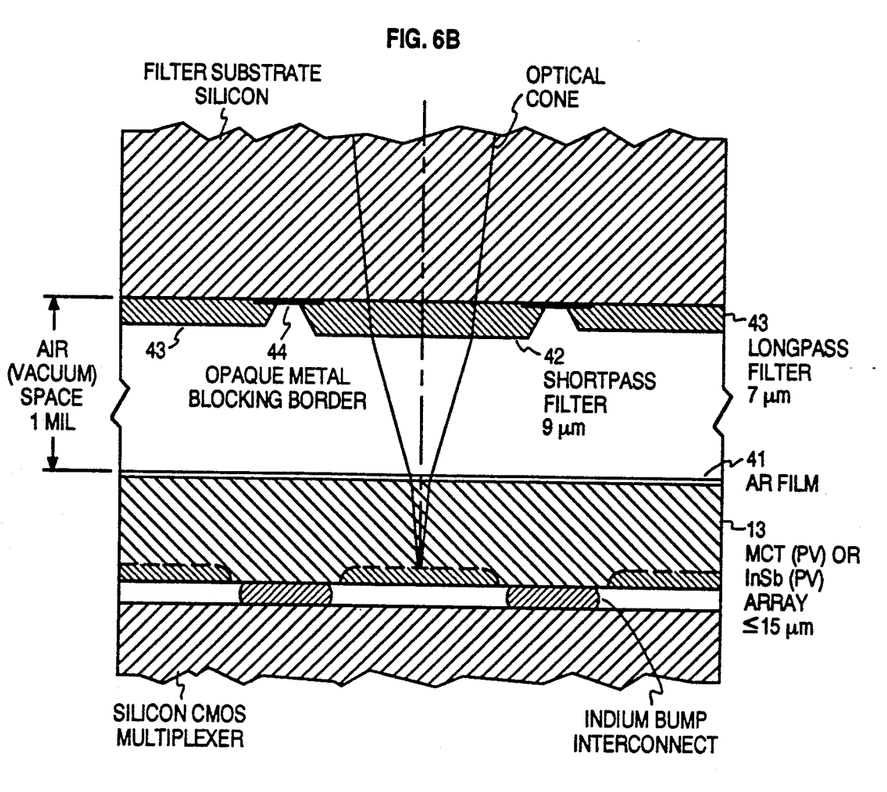

The inventive patterned filters may take several forms, a checkerboard layout using square image samples being preferred. The layout is illustrated in Figures 6A and 6B, the first showing a plan view of several filter elements and the second showing a cross-section of several filter units. As shown in FIG. 6A, each (square) filter element covers four smaller squares, each square corresponding to a pixel on the IR detector array. Five filter squares marked 17A (shown without hatching) are shown, which are elements of the plume band filter and four filter squares marked 17B (shown with hatching) are shown, which are elements of the reference band filter. The IR array is a 256×256 element array based upon a 38 micron pixel pitch. Each filter square, which includes a 2×2 set of pixels is 76 microns ×76 microns (i.e. 3 mils by 3 mils) providing 128×128 filter squares. The 128×128 filter squares are organized into two interleaved 64 by 64 arrays, one for the plume band and the other for the reference band. Assuming square to square subtraction for clutter rejection purposes, the effective array produces a single, clutter discriminated 64×128 pixel image of the aircraft plume. For purposes of comparison, this represents an approximately 9 to 1 improvement in resolution over that available from using patterned bandpass filter elements.

The side view of three squares of the checkerboard filter unit (17A, 17B) is provided in FIG. 6B. The IR array is shown at 13. It is of Indium Antimonide (InSb), is about 15 microns thick with a high index of refraction of 4.0, and accordingly requires coating with an antireflective film 41 to decrease Fresnel reflection at the optically incident surface of the array. The filters (17A, 17B), as shown on a common substrate, are close-spaced approximately 1 mil from the array with the short pass filter element (42) 9 microns thick and the long pass squares (43) 7 microns thick. The checkerboard filter, shown in FIGS. 6A, 6B, is fabricated upon the under surface of a 15-20 micron thick silicon substrate 46 suitable for use in the mid-wave IR spectrum. The bandpass filter 16 may be an independently separate filter as shown in FIG. 1, or may be fabricated on the upper surface of the silicon filter substrate 46.

Each filter element, as shown in FIG. 6A and FIG. 6B, has the edges tapering approximately 30° from the normal to a substrate. At the filter edges, and continuing under the tapering boundaries, an opaque metal blocker strip 44 is formed around the edge of each filter element to prevent transmission of neighbor filter elements.

Registration of the filter elements to the IR array pixels is shown in both FIGS. 6A and 6B. Each filter element shown is 76 microns×76 microns square, thus matching a 2×2 set of pixels. The outer edges of each filter element are precisely aligned with the outline of the 2×2 set of pixels. This registration, in the interests of signal processing effectiveness, should be as accurate as possible with a goal of registration of the two color separation images (e.g. plume and reference) to 1/10 pixel.

Figure 7A:
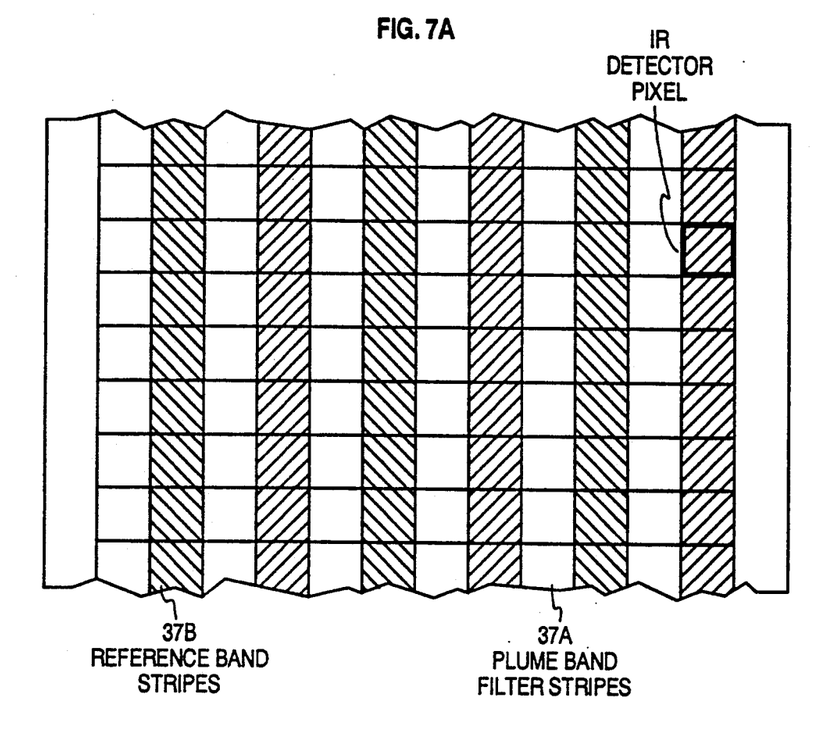
FIGS. 7A and 7B are plan and side elevation views respectively of a portion of a novel stripe filter pattern which in combination with a bandpass filter is an optional spatially patterned variation on the checkerboard, providing narrow waveband selection with improved IR image background discrimination as illustrated in FIGS. 4C and 5C, and 4E and 5E.
Figure 7B:
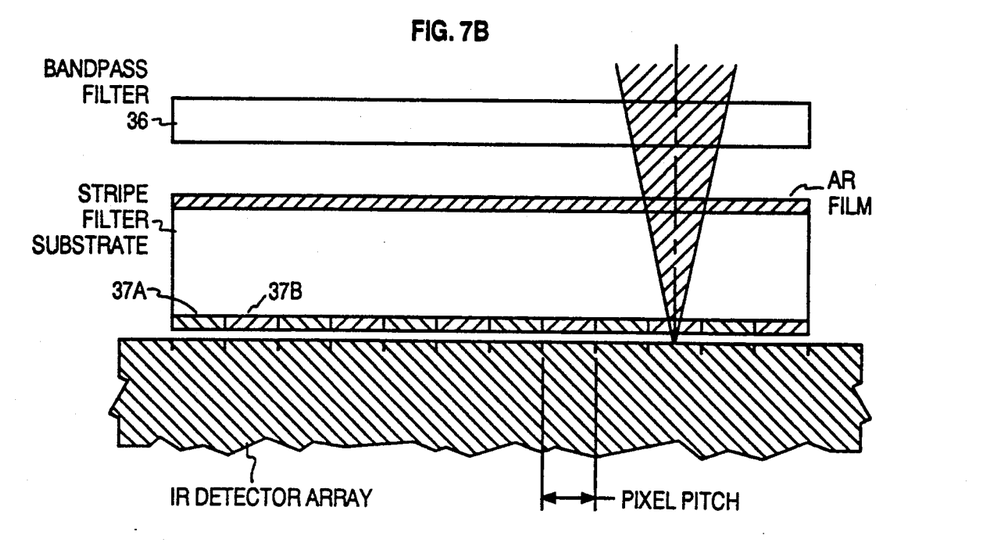

FIGS. 7A and 7B represent a plan view and side view respectively of the IR detector array 13 with an unpatterned bandpass filter 36 and a stripe filter 37A, 37B arranged in close proximity to and in registration with the IR detector array. The plume band filter stripes are shown at 37A without cross hatching while the reference band filter stripes at 37B are shown with cross hatching. In FIG. 7A, the filter stripes are shown overlaying a rectangular grid which corresponds to the registration of the filter stripes with the rows of pixels of the infrared detector.

In accordance with the invention, the use of a bandpass. Filter 36 permits a set of thin short pass and long pass filters 37A and 37B. The thickness, as before, need only be from 7 to 9 microns permitting formation of an individual filter stripe at 2 to 4 mils wide. This construction is illustrated in FIG. 7A with detector array 13 having a 2 to 4 mil pixel pitch to which the stripes of the filters 37A and 37B are matched.

A final aspect of the optical design is a selection of the material of the bandpass, long wave pass and short wave pass filters (16, 17A, 17B) to increase the average index of refraction. An increase in the average index of refraction reduces the wavelength shift experienced by light transiting the filters at substantial angles of incidence. The shift is dependent upon a factor whose independent variable is the effective index of refraction of the filter materials.

The customary wave interference filters employ multiple layers with alternating indices of refraction. The more common materials are Germanium (Ge) which has an index of refraction of 4.0; Zinc Sulfide (ZnS) which has an index of refraction of 2.3, and Poly Silicon (S$_1$O$_x$) which has a range of indices averaging approximately 1.7.

The more conventional filter design using one quarter wave of Germanium and one quarter wave of ZnS exhibits an average index of refraction of 2.85. A design which utilizes five quarter wave sections of Ge and a quarter wave section of ZnS exhibits an average index of refraction of 3.7. Assuming an angle of incidence at the margins of the image of 30°, light at a wavelength of 4.7 microns, using the higher index of refraction construction exhibits a downward shift in wavelength of only 0.0427μm. A filter using the lower average index materials provides a downward shift of 0.0729μm, almost twice the wavelength shift. Accordingly, in wide field of view optics the use of filter materials having a higher index of refraction for the long wave pass and short wave pass filters gives the lowest wavelength shift.

What is claimed is:

1. In a camera responding to two narrow waveband IR images of the same object field, the combination comprising:
   A) a quasi-telecentric objective lens for imaging an IR illuminated object field upon a focal plane;
   B) a two dimensional IR detector array consisting of rows and columns of individual pixels arranged upon said focal plane for response to the IR image;
   C) a bandpass filter arranged between said objective lens and said array for selecting a portion of the medium wave infrared (MW IR) band including a narrow-wave reference band and a narrow-wave target detection band;
   D) a two part, patterned filter, one part providing long-wave pass filtering to a first group of pixels and the other part providing short-wave pass filtering to a second group of pixels, the two groups being equal sized and uniformly distributed over the array,
   the longer wavelength limit of the passband of the bandpass filter and the cut-on wavelength of the long-wave pass filter being chosen to provide a passband for selection of one of said narrow-wave bands for application to one group of pixels, and the shorter wavelength limit of the passband of the bandpass filter and the cut-off wavelength of the short-wave pass filter being chosen to provide a passband for selection of the other narrow-wave band for application to the other group of pixels.

2. The combination set forth in claim 1, wherein:
   each of said groups of pixels consists of a set of individual lines of pixels parallel to one array dimension, one group being the set of even lines and the other group being the set of odd lines.

3. The combination set forth in claim 1, wherein:
   each group consists of a plurality of equal sized rectangular sets of pixels uniformly distributed over said array.

4. The combination set forth in claim 1, wherein:
   the array is square, and wherein
   each group consists of a plurality of equal sized square sets of pixels, the square sets of one group being arranged along diagonal lines crossing the array, the square sets of the other group being arranged in alternate diagonal lines in the remaining area of the array to form a checkerboard pattern.

5. The combination set forth in claim 1, wherein:
   the narrow-wave reference-band is the thermal reference-band from approximately 4.7 to 4.9 microns and the narrow-wave target detection band is the red spike of the plume band from approximately 4.5 to 4.7 microns, and
   the passband of the bandpass filter is approximately 4.5 to 4.9 microns, the cut-on wavelength of the long-wave pass filter and cut-off wavelength of the short-wave pass filter are approximately 4.7 microns.

6. The combination set forth in claim 1, wherein:
the narrow-wave reference-band is the solar reference-band from approximately 3.9 to 4.1 microns and the target detection band is the ed spike of the plume band from approximately 4.5 to 4.7 microns, and
the passband of the bandpass filter is approximately 3.9 to 4.7 microns, the wavelength of the short-wave pass filter at cut-off is approximately 4.1 microns, and the wavelength of the long-wave pass filter at cut-on is approximately 4.5 microns.

7. The combination set forth in claim 1, wherein
the objective lens includes telecentric elements to provide angles of incidence at the boundaries of the image on the IR array, substantially reduced from the extreme angle of incidence of ray bundles imagining at the boundaries of the objective lens to reduce the waveband shift of said filers to ray bundles at large angles of incidence.

8. The combination set forth in claim 1, wherein:
the materials of the bandpass and patterned filters are selected to provide a high average index of refraction to reduce the band shift of the filters.

* * * * *